(12) United States Patent
Sadok et al.

(10) Patent No.: US 8,797,916 B2
(45) Date of Patent: Aug. 5, 2014

(54) NETWORK ADDRESS ALLOCATION METHOD

(75) Inventors: Djamel Sadok, Jaboatão dos Guararapes (BR); Rafael Roque Aschoff, Recife (BR); Judith Kelner, Jaboatão dos Guararapes (BR); Eduardo Souto, Manaus (BR)

(73) Assignee: Ericsson Telecomunicacoes S.A., Sao Paulo SP (BR)

( * ) Notice: Subject to any disclaimer, the term of this patent is extended or adjusted under 35 U.S.C. 154(b) by 170 days.

(21) Appl. No.: 13/386,102

(22) PCT Filed: Jul. 20, 2009

(86) PCT No.: PCT/BR2009/000215
§ 371 (c)(1),
(2), (4) Date: Jan. 20, 2012

(87) PCT Pub. No.: WO2011/009177
PCT Pub. Date: Jan. 27, 2011

(65) Prior Publication Data
US 2012/0224505 A1 Sep. 6, 2012

(51) Int. Cl.
*H04L 12/28* (2006.01)
*H04W 8/26* (2009.01)
*H04L 29/12* (2006.01)

(52) U.S. Cl.
CPC ............ *H04L 29/1232* (2013.01); *H04W 8/26* (2013.01); *H04L 61/2092* (2013.01)

USPC .......................................... 370/254; 370/238

(58) Field of Classification Search
USPC ................... 370/252–254, 431–464
See application file for complete search history.

(56) References Cited

U.S. PATENT DOCUMENTS

| 5,515,369 | A   | * | 5/1996  | Flammer et al. | 370/480 |
|-----------|-----|---|---------|----------------|---------|
| 7,095,850 | B1  | * | 8/2006  | McGrew         | 380/42  |
| 7,860,912 | B1  | * | 12/2010 | Gyugyi et al.  | 708/254 |
| 2001/0030973 | A1 | * | 10/2001 | Lomp et al.    | 370/441 |
| 2005/0094604 | A1 | * | 5/2005  | Ozluturk et al. | 370/335 |
| 2009/0168796 | A1 | * | 7/2009  | Pandey et al.  | 370/458 |

\* cited by examiner

*Primary Examiner* — Andrew Chriss
*Assistant Examiner* — John Lequang (57) ABSTRACT

A distributed network address allocation method is disclosed. For this purpose, an apparatus is provided for use as or in a node of the network. The apparatus comprises a portion (2, 3, 4) for maintaining a seed value n and a state value s. An address (8) of the node is determined from the seed value n by address setting portion (6). A portion (9) is provided for receiving a request from a new node wishing to join the network and itself adapted to perform the method. A portion (10, 12) is provided for generating a proposed seed value using the formula $(n+2^s)$ and a proposed state value using the formula $(s+1)$. A portion (14) is provided for offering the proposed seed and state values to the new node. A portion (18) is provided for updating the node's state value s to be the same as that accepted by the new node, if the proposed seed and state values are accepted by the new node. This provides unique address allocation to nodes in a Mobile Ad-Hoc Network.

6 Claims, 5 Drawing Sheets

NETWORK ADDRESS ALLOCATION METHOD

TECHNICAL FIELD

The present invention relates to a network address allocation method.

BACKGROUND

A Mobile Ad-Hoc Network (MANET) is a wireless network in which the nodes can freely and dynamically self-organize into arbitrary and temporary network topologies, allowing people and devices to seamlessly internetwork in areas without a central coordination or a pre-established communication infrastructure.

In such networks, the address assignment to mobile devices is one of the most important network configuration parameters. In practice, no mobile device can participate in any form of communication until it is assigned an address. Furthermore, the majority of the routing protocols assume that mobile nodes in ad hoc networks are configured a priori with unique address identifiers before they gain access to the network. However, the pre-configuration of a static address is not always possible and has some drawbacks. The use of traditional IP-based address assignment schemes, such as DHCP, is not feasible because nodes in a MANET environment are highly mobile and a permanent central infrastructure component is not always reachable to any node. In addition, due to possible frequent node mobility from one network to another, other address issues need to be handled like duplicate address detection, abrupt disconnections, network partitioning, and merging. Accordingly, an auto-configuration scheme is essential to building self-organized network systems.

Several auto-configuration schemes have previously been proposed for MANETs. They could be classified as stateful or stateless approaches according to the management of the address space. For stateful approaches, the state of each node is held in such a way the network has a vision of assigned and non assigned addresses. Stateless approaches do not have a network view, and each node chooses its own address.

The stateless approaches are all decentralized and use some self-configuration address allocation method in which a node can configure itself using a combination of locally available information such as its hardware address, a pre-assigned UUID (Universally Unique Identifier) [S. Cheshire, B. Aboba, and E. Guttman, Dynamic Configuration of IPv4 Link-Local Addresses, draft-ietfzeroconf-ipv4-linklocal-17.txt, IETF Zeroconf Working Group, July 2004][S. Thomson and T. Narten, IPv6 Stateless Address Autoconfiguration, RFC 2462, December 1998], or even a random number [C. E. Perkins, J. T. Malinen, R. Wakikawa, E. M. Belding-Royer, and Y. Sun, IP Address Autoconfiguration for Ad Hoc Networks, draft-ietfmanet-autoconf-01.txt, IETF MANET Working Group, July 2000]. For this reason, the stateless approaches almost always make use of a mechanism for Duplicate Address Detection (DAD) to resolve address conflicts, and so, ensure address uniqueness over the network. There are at least three common types for DAD: Strong DAD (SDAD) [N. Vaidya, "Weak Duplicate Address Detection in Mobile Ad Hoc Networks", In Proc.ACM MobiHoc 2002, June 2002], Weak DAD (WDAD) [N. Vaidya, supra], and Passive DAD (PDAD) [K. Weniger, "Passive Duplicate Address Detection in Mobile Ad Hoc Networks", In Proc.IEEE WCNC 2003, March 2003].

Strong DAD uses the metrics hop count and the DAD control message timer in order to deal with the problem of address duplication in MANET. In this technique, a node checks if a randomly chosen address is already in use by querying other nodes of the network. Based on a reply for the claimed request, which needs to arrive at the node within a finite bounded time interval, the node can detect address duplication in the network [N. Vaidya, supra]. However, the strong DAD may not detect a duplicate address of a node out the range of the hop-count (or TTL) of the DAD control message, so as a result the weak DAD has been proposed [N. Vaidya, supra].

The weak DAD [N. Vaidya, supra] and the passive DAD [K. Weniger, supra] can be designated as routing-based DAD since they use the routing protocol packet format to detect address conflicts including those that can arise after MANETs merger. In WDAD, a key is added to the routing control message, which can be chosen either randomly or based on a universally unique ID. This way, a node can figure out address conflicts when there are two messages with the same source address and distinct interfaces keys. The passive DAD can detect address duplication by using the sequence number of the routing control message and without using the additional information such as the interface key [Y. Kim, S. Ahn, Y. Lee, J. Jeong and J. Lee, "Design and Implementation of IPv6 Address Autoconfiguration for AODV in Mobile Ad Hoc Networks", The 2005 US-Korea Conference on Science, Technology & Entrepreneurship (UKC 2005), University of California at Irvine, Aug. 11-13, 2005].

In the stateful autoconfiguration approaches, nodes obtain addresses, other configuration information or both from one or more servers. Servers maintain a database that keeps track of which addresses have been assigned to which hosts. There are several stateful solutions that can differ in how and what information is kept. Such solutions can be divided into four sub-categories depending on their use of: a centralized allocation table, a distributed allocation table, distributed disjoint tables, and a distributed allocation function.

Centralized allocation table solutions are usually used in fixed networks since in MANETs it is often difficult to maintain a single centralized structure. In this approach a server acts as a centralized address pool of available addresses. When a node requires an address, it then sends a request and the server replies with a message which contains the address that was assigned to the requesting node. DHCP [R. Droms. Dynamic Host Configuration Protocol. IETF Network Working group—RFC2131, March 1997] is a good and well-known example of this approach.

Distributed allocation table solutions do not have a centralized structure, instead, they have a table that is maintained in a distributed way, where every node has a copy of such table, and messages are used to maintain the consistency of all tables. MANETconf [S. Nesargi and R. Prakash, MANETconf: Configuration of Hosts in a Mobile Ad Hoc Network, INFOCOM 2002] proposed a solution that makes all hosts record addresses already allocated. In MANETconf, a node that wants an address, must find a neighbour and request the address to it. The neighbour looks into its table and chooses an address that is not allocated, or a free address. After choosing a free address, the neighbour asks all other nodes for confirmation, to ensure that the selected address is really free. In the case that the address is really not in use, it will then be assigned to the new (requesting) node.

Distributed disjoint tables solutions are different from the previous presented table based solutions because the maintained tables are different between nodes. In [A. Tayal and Patnaik L., "An Address Assignment for the Automatic Configuration of Mobile Ad hoc Networks", Personal Ubiquitous Computing, 2004], a method for address allocation that uses the concept of binary split is presented. In the proposed method, a new node that is willing to join the MANET has to contact an existing one. The previously configured node, takes it address pool, divides it into two parts and gives one half to the requesting node. In the event that the requesting node does not have an address pool, it starts searching for nodes that might have it. In the proposed method, every node has a disjoint address pool that it can use to assign addresses to a new node without consulting any other one in the network, except the case where it needs to forward the request.

Distributed allocation function based solutions are different from all previous stateful solutions introduced so far. They do not use an address allocation table. The address allocation methods used in this class of approaches, establish that each node uses a generation function and maintains a state value, in order to generate a disjoint set of addresses. Examples of solutions that make use of methods like these are: Prophet Address Allocation [H. Zhou, L. M. Ni, and M. W. Mutka, Prophet Address Allocation for Large Scale MANETs, INFOCOM 2003], and Prime Numbering Address Allocation (PNAA) [Y.-Y. Hsu and C.-C. Tseng. Prime DHCP: A Prime Numbering Address Allocation Mechanism for MANETs. IEEE Communication Letters, 9(8), August 2005].

Prophet is a solution that supports partition and merges MANET operations through an advanced address management mechanism. Prophet's address allocation method generates, with a high probability, a unique sequence of addresses. The efficiency of the proposed method depends on the address space, where the bigger the address space used, the less likely of a conflict occurring. Although address duplication may still happen in Prophet, it can nonetheless be predicted.

The PNAA approach eliminates address conflicts to ensure precisely a unique sequence of addresses for each node. This method stems from the mathematical definition that every positive number can be written as a product of prime numbers in a unique way. PNAA states that the first node that creates a network is the root node and has address 1 (one). The root node allocates all prime numbers in sequence to new nodes. Non-root nodes allocate addresses as their own address multiplied by a prime number which starts from the biggest prime factor of its own address.

The present applicant has appreciated the following problems with the existing solutions.

A major drawback of stateless solutions is the need to confirm and check address uniqueness through DAD techniques, usually, by flooding the entire network. This introduces a large and unnecessary overhead. The solutions that use hardware addresses also suffer from privacy problems, because they tend to generate the same addresses and can easily be tracked [T. Narten, R. Draves, Privacy Extensions for Stateless Address Autoconfiguration in IPv6, RFC3041 January 2001].

Centralized allocation table solutions do not fit well into MANETs due to their dynamic nature. These solutions only work when the allocation server never gets disconnected from the network. Moreover, as nodes that do not have direct access to the server need to use intermediary nodes, a small additional overhead is introduced. Its level depends on the network topology and some nodes can get their resources exhausted by forwarding messages to the server.

Distributed allocation table solutions solve the problems that arise from a centralized server, but introduce a new one, namely, the need to maintain, in a distributed way, the consistency of the allocation table.

Although MANETconf, for example, guarantees address uniqueness, the table synchronization method is complex and the address assignment process uses network flooding, hence consuming network bandwidth. The solution could also generate a high delay because, before a node can allocate an address, it needs to ask all the other network nodes for permission to do so.

Distributed disjoint tables solutions are a good alternative that minimizes such additional traffic, but the allocation function needs to be suitably designed to guaranty the generation of unique addresses.

The Prophet solution is very easy to implement, but it cannot find a function that generates no address duplication, and is only applicable to large address space MANETs.

PNAA introduces a conflictless number generator, that is easy to understand but its address space utilization is not optimized since it is not well distributed among non-root nodes. Network partition and merge operations are also supported but the idea introduced to accomplish this goal could be optimized. The method used to deal with abrupt node departure tries to recover addresses as early as possible, which is not good in a high mobile environment, in which nodes may go off range frequently, also partitions are formed an merged back, and can cause too much overhead in the case of a previous address recovery.

SUMMARY

According to a first aspect of the present invention there is provided a method for use by a node of a network, comprising: maintaining a seed value n and a state value s, with a configuration parameter of the node being determined from the seed value n; receiving a request from a new node wishing to join the network and itself adapted to perform the method; generating a proposed seed value using the formula $(n+2^s)$ and a proposed state value using the formula $(s+1)$; offering the proposed seed and state values to the new node; and, if the proposed seed and state values are accepted by the new node, updating the node's state value s to be the same as that accepted by the new node.

The configuration parameter may form at least part of an address of the node.

The configuration parameter may be determined to be n.

The proposed seed value may be $(n+2^s)$.

The proposed state value may be $(s+1)$.

According to a second aspect of the present invention there is provided an apparatus for use as or in a node of a network, comprising: means for maintaining a seed value n and a state value s, with a configuration parameter of the node being determined from the seed value n; means for receiving a request from a new node wishing to join the network and itself adapted to perform the method; means for generating a proposed seed value using the formula $(n+2^s)$ and a proposed state value using the formula $(s+1)$; means for offering the proposed seed and state values to the new node; and means for updating the node's state value s to be the same as that accepted by the new node, if the proposed seed and state values are accepted by the new node.

According to a third aspect of the present invention there is provided a program for controlling an apparatus to perform a method according to the first aspect of the present invention or which, when loaded into an apparatus, causes the apparatus to become an apparatus according to the second aspect of the present invention. The program may be carried on a carrier medium. The carrier medium may be a storage medium. The carrier medium may be a transmission medium.

According to a fourth aspect of the present invention there is provided an apparatus programmed by a program according to the fourth aspect of the present invention.

According to a fifth aspect of the present invention there is provided a storage medium containing a program according to the fourth aspect of the present invention.

An embodiment of the present invention offers at least one technical advantage of addressing at least one of the issues mentioned above relating to the prior art; this is set out in more detail below.

DETAILED DESCRIPTION

An embodiment of the present invention relates to address allocation for mobile ad hoc networks. It uses a Distributed Binary Unique Number Generator that can be used in a conflictless, distributed and dynamic node configuration method which guarantees that addresses assigned by different nodes are exclusive, so that no DAD scheme is required.

The number generator proposed for use in an embodiment of the present invention is a low complexity function that receives a pair of parameters or variables (n, s) and produces a new pair, as shown in the following Equation:

$$f(n,s)=(n+2^s, s+1)$$ (Equation 1)

All nodes configured for performing an address allocation (auto configuration) method embodying the present invention maintains (or at least has access to) the pair of parameters needed for input to the above function. The variable n is the seed of the function, which usually does not change and is used to form the node's address. The variable s is used to maintain a state, and is updated after successful allocations. As will be described below in detail, the first output $(n+2^s)$ is the seed to be offered to a new node joining the network, while $(s+1)$ is the offered state; both are sent to the new node for configuration purposes, with the offered seed being used to form the new node's address.

Figure 1:
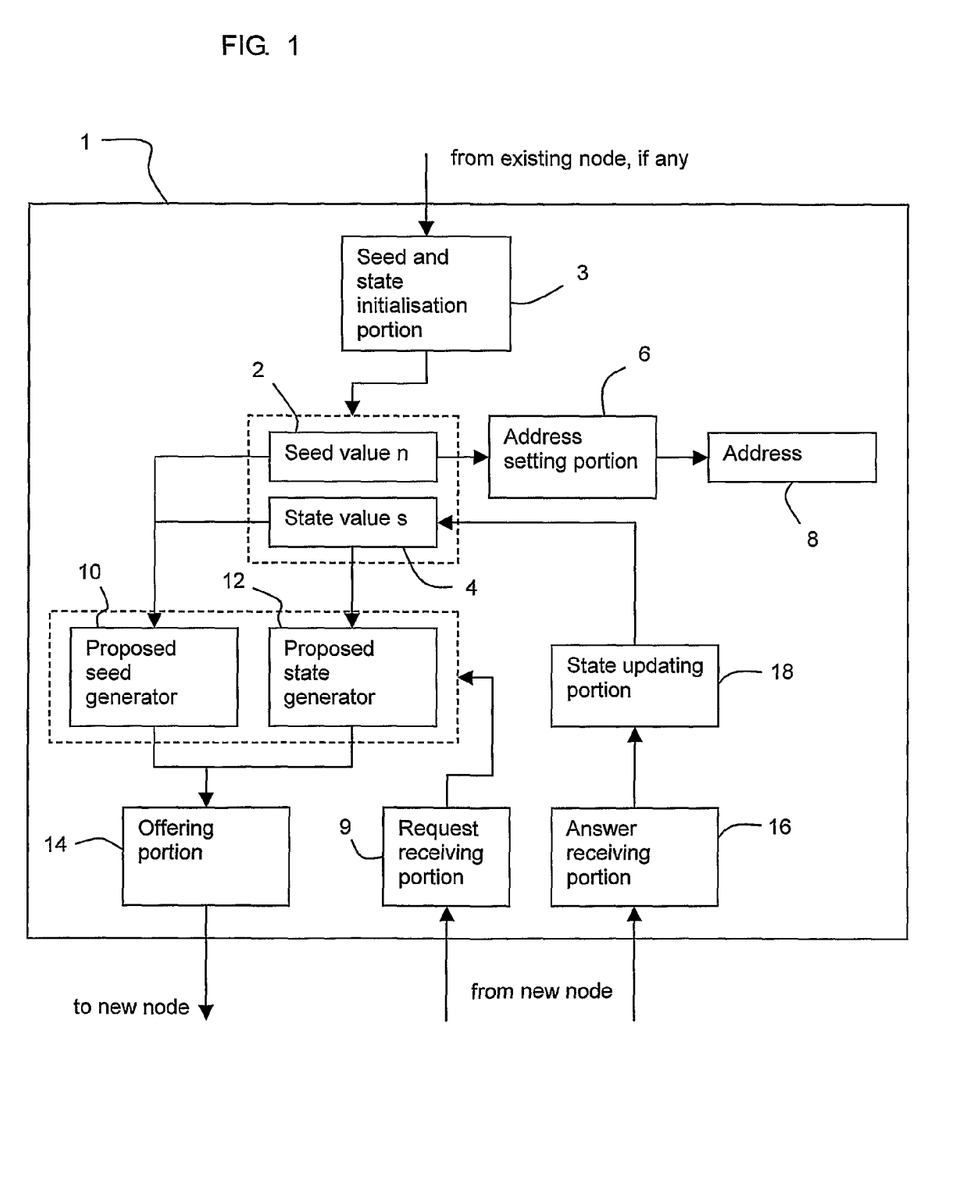
FIG. 1 is an illustrative block diagram showing parts of a node embodying the present invention.

FIG. 1 is an illustrative block diagram showing parts of a node 1 embodying the present invention. The node 1 comprises a store 2 for holding a seed value n, a store 4 for holding a state value s, a seed and state initialising portion 3, a store 8 for holding an address, an address setting portion 6, a request receiving portion 9, a proposed seed generator 10, a proposed state generator 12, an offering portion 14, an answer receiving portion 16, and a state updating portion 18.

Figure 2:
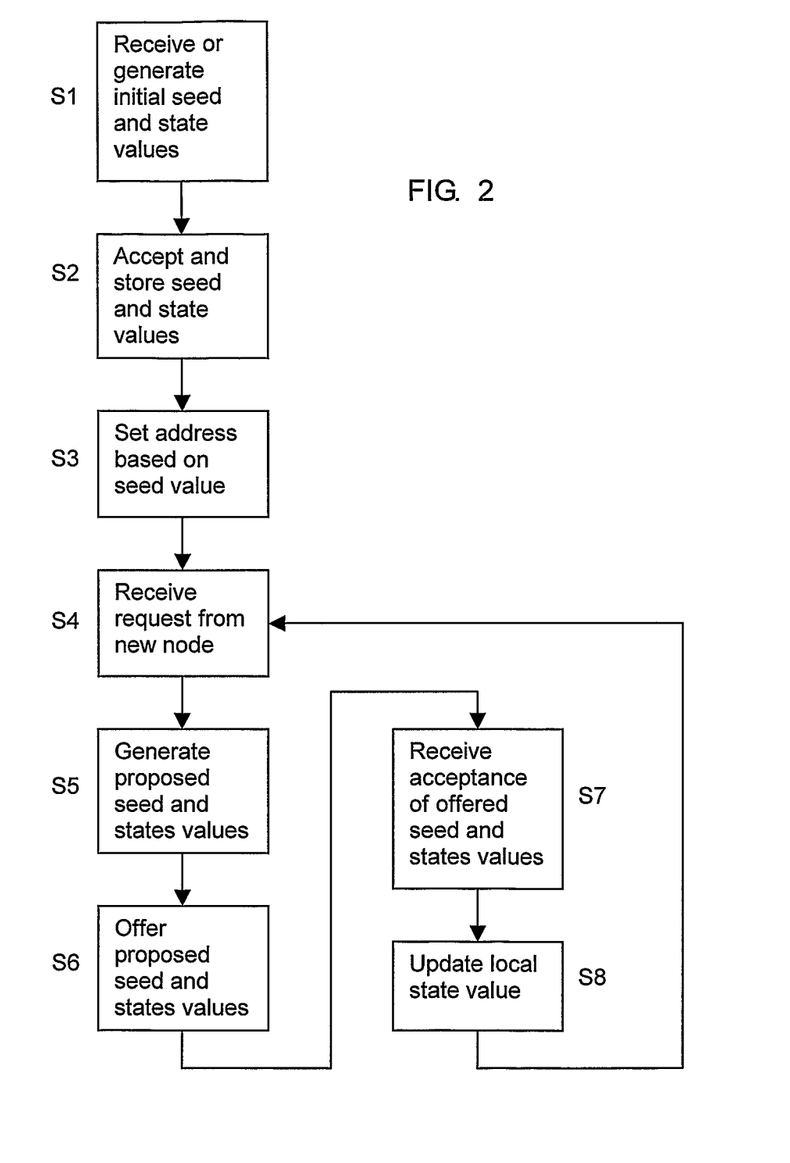
FIG. 2 is an illustrative flow chart showing steps of an address allocation method embodying the present invention.

Operation of these parts will now be described with reference to the illustrative flowchart of FIG. 2 and the illustrative sequence of FIGS. 3A to 3G. Each of the nodes A to G illustrated in FIG. 3 is of a type shown in FIG. 1, and is configured for performing a method as illustrated in FIG. 2.

Figure 3A:
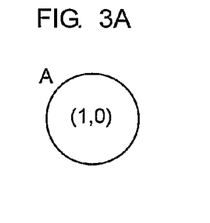
FIGS. 3A to 3G is a sequence of illustrations showing the use of an embodiment of the present invention to allocate a configuration (seed, state) to a number of nodes in turn as each node joins the network.

At the start of the sequence of FIGS. 3A to 3G, as shown in FIG. 3A, a network consists of a single node A, awaiting other nodes to join its network. In step S1, since node A is the first node in the network, the seed and state initialization portion 3 of node A generates an initial seed value of 1 and an initial state value of 0, or receives these initial values from an administrator, and in step S2 stores these values in stores 2 and 4 respectively. These values are maintained in their respective stores 2 and 4. Using the notation above, the initial seed-state pairing (n, s) for node A is therefore (1,0). In step S3, the address setting portion 6 of node A sets its address to the initial seed, i.e. to 1, and this is stored in the address store 8 of node A.

Figure 3B:
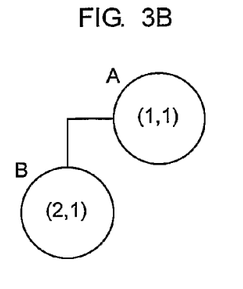

Moving now to the stage illustrated in FIG. 3B, in step S4 the request receiving portion 9 of node A receives a request from node B to join the network. This prompts step S5, in which the proposed seed generator 10 of node A generates a proposed seed and the proposed state generator 12 of node A generates a proposed state, both in accordance with the function shown in Equation 1 above. Since (n, s) for node A is at present (1,0), the function of Equation 1 becomes $f(1,0)=(1+2^0, 0+1)=(2,1)$. This means that node A is proposing that node B initialize itself with a seed of 2 and a state of 1. (Note, this is only a proposal, because it may be that node B has sent a similar request to other nodes of the network and received a different proposal, with only one of these proposals being accepted, for more of which see below.)

In step S6, the offering portion 14 of node A sends to node B the proposed seed-state pairing of (2, 1). This then triggers step S1 for node B, in which the proposed seed-state pairing is received at portion 3 of node B, and in step S2 node B accepts and stores the proposed seed-state pairing in stores 2 and 4 of node B. Node B then performs step S3, in which it sets its address to the accepted seed, i.e. to 2, and this is stored in the address store 8 of node B.

As part of the accepting step S2 performed by node B, node B sends an answer message to node A to inform node A that it has accepted node A's proposed seed-state pairing, and this is received at the answer receiving portion 16 of node A in step S7.

Following receipt of this acceptance from node B, in step S8 the state updating portion 18 of node A increments the state value stored in store 4, or in other words sets it to the same state as proposed to and accepted by node B, which is 1.

Therefore, at the end of this stage, the seed-state pairing of node A is set to (1,1) and the seed-state pairing of node B is set to (2,1), as is illustrated in FIG. 3B.

After step S8, processing returns to step S4, in which node A waits for receipt of another request to join the network. It will be understood that Node B is also adapted to perform steps S4 to S8 upon receipt at node B of a request from another node, using parts 9 to 18 of node B, but this will not be described in detail here because the steps are entirely equivalent to those described in detail in respect of node A; a scenario in which node B allocates a seed-state pairing to a new node is illustrated in FIG. 3E and described in brief below.

With the above detailed description of the steps performed when a new node sends a request to an existing node to join the network, a brief description will now be provided of further stages in which further nodes request to join the network.

Figure 3C:
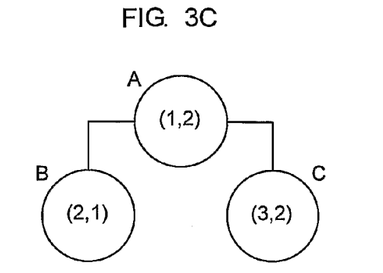

Referring to FIG. 3C, node C requests node A to join the network. Since the seed-state pairing of node A is set to (1,1) following a first call to the function of Equation 1, a second call will be as follows: $f(1,1)=(1+2^1, 1+1)=(3,2)$; therefore node C will receive (and in this example accept) the seed-state pairing of (3, 2), with node A again incrementing its own state (or equivalently setting its state to match that accepted by node C) to result in a seed-state pairing for node A of (1,2).

Again, it is noted that node A only increments its state once it has received confirmation from node C that it has accepted the pairing sent.

Figure 3D:
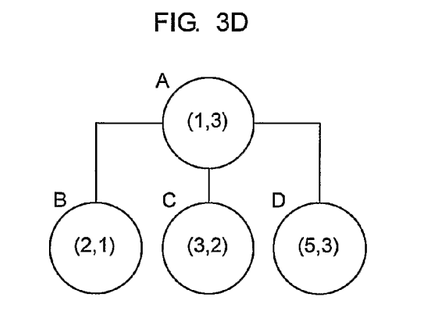
Figure 3E:
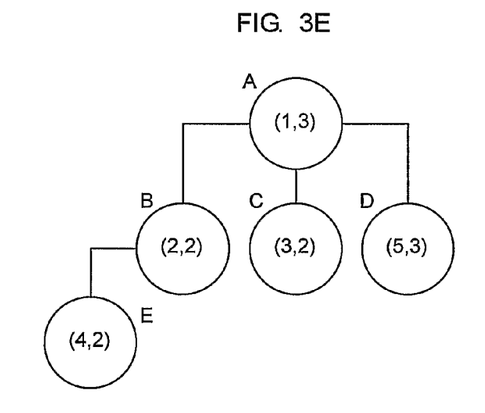

FIG. 3D shows the seed-state pairings after node D has joined the network, following a request to node A. Inputting node A's seed-state pairing (1,2) at the time of receiving the request (see FIG. 3C) into the function of Equation 1, it is apparent that node D will receive (and in this example accept) a seed-state pairing according to $f(1,2)=(1+2^2,2+1)=(5,3)$, with node A updating its own state to match that of node D, resulting in a seed-state pairing for node A of (1,3).

FIG. 3E shows the seed-state pairings after node E has joined the network, following a request to node B. Inputting node B's seed-state pairing (2,1) at the time of receiving the request (see FIG. 3D) into the function of Equation 1, it is apparent that node E will receive (and in this example accept) a seed-state pairing according to $f(2,1)=(2+2^1,1+1)=(4,2)$, with node B updating its own state to match that of node E, resulting in a seed-state pairing for node B of (2,2).

Figure 3F:
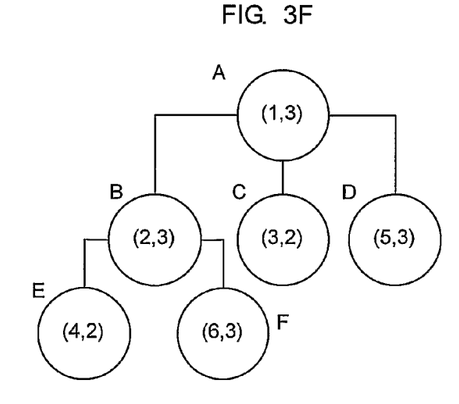

FIG. 3F shows the seed-state pairings after node F has joined the network, following a request to node B. Inputting node B's seed-state pairing (2,2) at the time of receiving the request (see FIG. 3E) into the function of Equation 1, it is apparent that node F will receive (and in this example accept) a seed-state pairing according to $f(2,2)=(2+2^2,2+1)=(6,3)$, with node B updating its own state to match that of node F, resulting in a seed-state pairing for node B of (2,3).

Figure 3G:
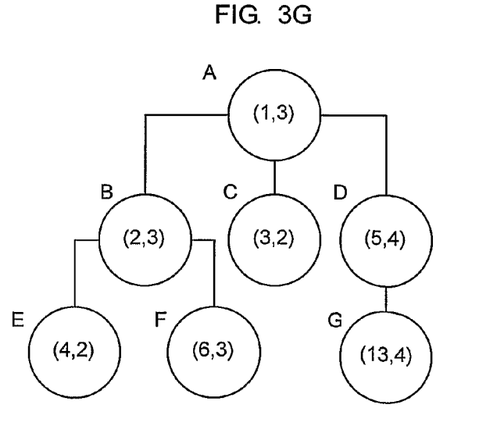

Finally, FIG. 3G shows the seed-state pairings after node G has joined the network, following a request to node D. Inputting node D's seed-state pairing (5,3) at the time of receiving the request (see FIG. 3F) into the function of Equation 1, it is apparent that node G will receive (and in this example accept) a seed-state pairing according to $f(5,3)=(5+2^3,3+1)=(13,4)$, with node D updating its own state to match that of node G, resulting in a seed-state pairing for node D of (5,4).

It will be seen that each of the nodes A to G has been allocated a unique seed (which is not generally updated), and therefore a unique set of addresses can be allocated to these nodes by setting their respective addresses (or a part thereof) to be the same as their respective seeds. For example, when applied to an IPv4 network, the seed could be used to set the final octet of the IPv4 address. Relating this to the example shown in FIGS. 3A to 3G, and assuming a network prefix of 192.168.5, node A would be configured with an IPv4 address of 192.168.5.1 (since it has a seed of 1), while node G would be configured with an IPv4 address of 192.168.5.13 (since it has a seed of 13); in general, the node would be configured with an IPv4 address of xxx.yyy.zzz.s, where xxx.yyy.zzz is the IPv4 network prefix and s is the node's seed.

It will be appreciated that it is not essential that the appropriate part of the node's address is set to be exactly the same as the seed s. It would be possible, for example, for the node's address to be set based on the seed s in some other way, for example to set the address to s+m, where m is a constant used by all the nodes configured to perform the method. Other ways of configuring the node's address based on the seed s would be readily apparent to the skilled person.

Of course, a method embodying the present invention is not limited to allocation of IPv4 addresses, and indeed not limited to allocation of network addresses in general. A method embodying the present invention could be used to allocate unique configuration parameters of any type to a plurality of nodes; the unique configuration parameters could be network addresses, parts of network addresses, or anything else.

When a new node is wishing to enter an existing network, it would broadcast a request message which would potentially be received by a plurality of nodes already in the network. Each of the plurality of nodes would, if operating according to the above-described scheme, generate a proposed seed-state pairing and send this to the new node. It would then be up to the new node to select which of the proposed seed-state pairings to accept; one way of deciding which seed-state pairing to use would be to choose the seed-state pairing with the lowest seed, but other ways of deciding would also be possible. The node which proposed the accepted seed-state pairing would update its state as set out above, with the other nodes leaving their respective maintained states alone.

Following the above description of a specific embodiment of the present invention, further issues relating to the present invention will now be covered, like request forwarding, used when the generated seed output is outside the address space boundaries. Further issues like network partition, network merger, node abrupt departure will also be discussed as well as ways of handling them.

In order to communicate among themselves, ad hoc nodes need to configure their network interface(s) with unique addresses that are valid within an ad hoc network. As discussed above, an embodiment of the present invention proposes a new distributed number generator function that helps nodes in these networks to configure their addresses.

The proposed function generates only disjoint set of addresses per node, which guarantees that addresses assigned by different nodes are exclusive. While this approach is beneficial in not suffering the limitations of DAD, a method that uses an embodiment of the present invention would preferably have some mechanism to recover lost address space, which can happen as a result of abrupt departures or disconnections of nodes.

A complete auto configuration solution would preferably also be able to deal with network partition and merger. The proposed function helps in dealing with such problems because when a network gets partitioned, the nodes continue to generate unique numbers, and when these partitions joined back, no conflict is introduced. Only when two a-priori unrelated networks merge is a need for one network to re-execute an algorithm according to an embodiment of the present invention to ensure address uniqueness. Either way, a simple network ID could detect such merger by allowing nodes to check for the presence of different networks IDs. Address recovery would also be aligned with the network merging procedure, since the distributed numbers are likely not to be unique to each network. A simple solution could be to change the network ID when recovery is enforced.

Another issue relates to what happens when a network gets close to running out of addresses. Some nodes may no longer have available addresses anymore, and some support for address request forwarding could be implemented in order to ensure that every new node will get an address as long as this is available at some node of the network.

Further details of the Distributed Binary Unique Number Generator Function, as used in the above-described embodiment of the present invention, will now be provided.

The problem of allocating addresses for MANETs can be viewed as how to assign different numbers from an integer range to different nodes. Solutions based on distributed allocation functions often try to split the original range into several distinct subsets and then provide these to the nodes.

Distributed allocation function based solutions differ from other approaches by not using an address allocation table; instead, each node uses a generation function and maintains a state value, in order to generate a disjoint set of addresses.

The proposed function is based on the specific characteristics of the binary number system. The binary numerical system or base-2 numbering system represents numeric values using two symbols, usually 0 and 1. The binary number system inherits an important property from the positional notation system that states that every two sequences of symbols (0 and 1) are guaranteed to have distinct values as long as they differ in at least a single position.

Exploring this idea, it is possible to develop a conflictless function if any two (or more) nodes involved in a successful request reply process can ensure that they will never generate the same sequence.

Figure 4:
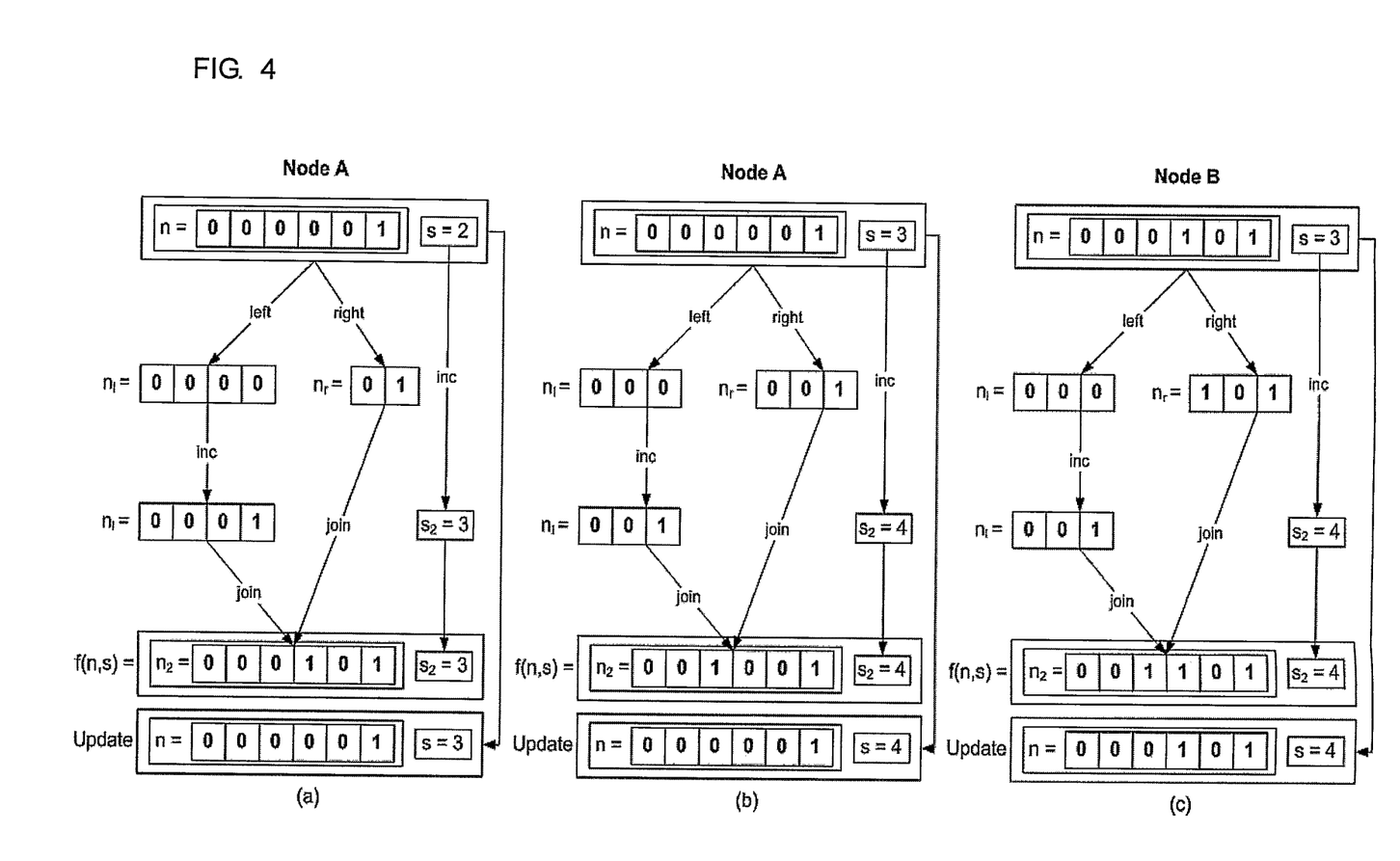
FIG. 4 illustrates one possible bit-level implementation of an address allocation function in an embodiment of the present invention, and is also for explaining operation of an embodiment of the present invention.

FIG. 4 shows the function behaviour for a six bit length sequence, where seed n is the working sequence, and s is the state maintained. The problem is to ensure that n is different for every node. To generate a new n value, the node uses s as the number of fixed positions in the sequence n, and increments the remaining bits. The new maintained state and the output state are equal to the current state incremented by one unit. In this way, the current used seed and the new generated seed will always be different at least by one position. Since there is a state that controls the fixed positions, the two nodes will never generate the same sequence.

Consider a sequence of size t, and a maintained state of value s, where t>n. The amount of possible sequences of size (t−s), that is the subsequence formed by the non-fixed bits, will be $2^{(t-s)}$. This number generator scheme achieves a good address space utilization because when a new seed is generated, and the state is updated, this amount of possible sequences will be $2^{(t-s-1)}=2^{(t-s)}/2$ for both nodes. This means that the address space is split by half for every seed generation, while seeds aim to be as low as possible, since we are changing the lower significant bits one at a time.

The desired behaviour described above can be achieved by a very efficient and low complexity function described in Equation 1.

Figure 5:
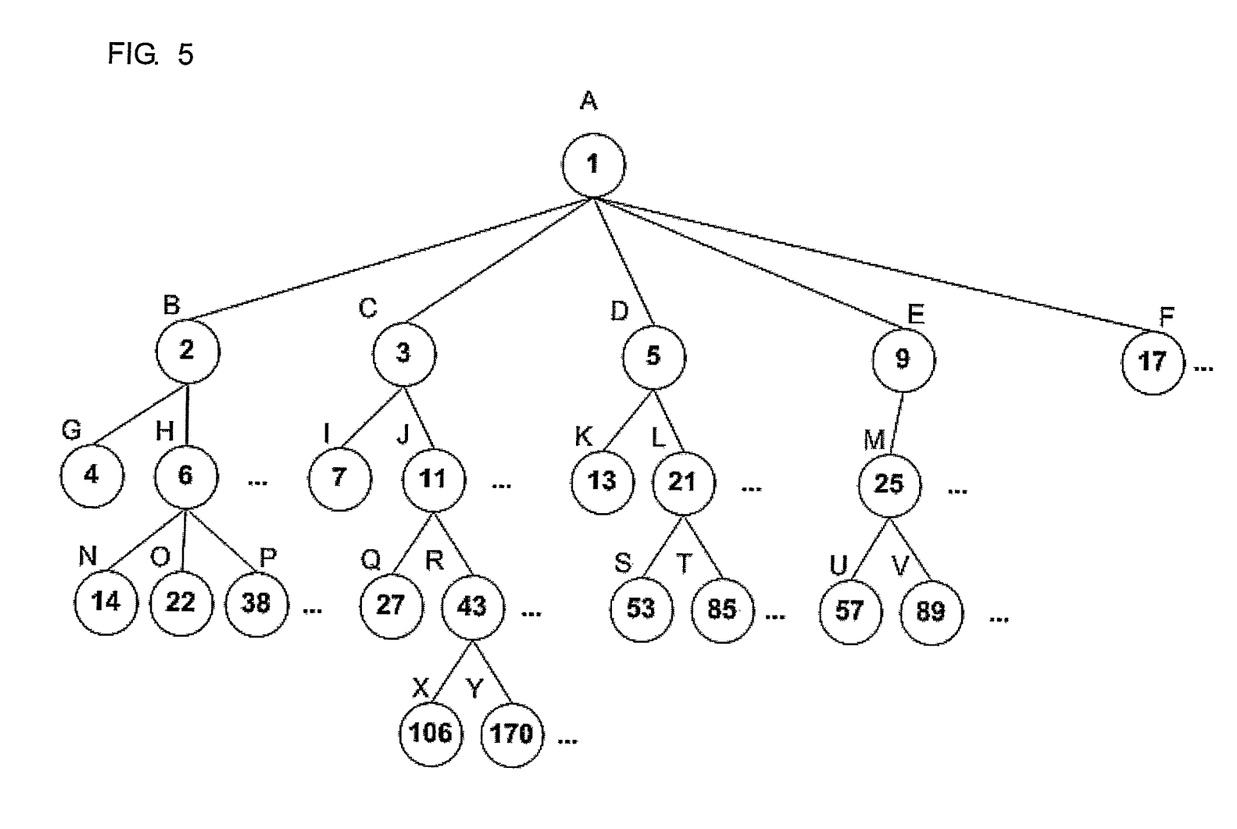
FIG. 5 illustrates a logical address allocation tree resulting through use of an embodiment of the present invention.

Based on the function behaviour of FIG. 4, and in Equation 1, a logical address allocation tree, as shown in FIG. 5, can be established to allocate a unique address to each node. The lowest seeds are generated first, providing a good quality distribution tree, and are interesting for use with adaptive compressing techniques.

Since every address space is limited by a number of bits, a method that uses this function should check its parameters before applying it. Considering an address space of size t, a node configuration of seed n, and state s, the function output will only be valid if $2^t-2>=n+2^s$, otherwise the node cannot act as a direct server anymore. The subtraction of two units in the equation above may be needed in some scenarios as the sequence with all zeros bits is not valid, and the sequence will all bits one is reserved for broadcast purposes as is the case in the IP addressing context for example.

Even if a node cannot act as a direct server, it still can participate in the proposed addressing mechanism by forwarding address allocation requests to other nodes and taking part in other functions such as address recovery procedures. The request forwarding procedure turns a node to operate just like a proxy. Address recovery procedures usually will make available a table of recovered configurations, which can then be used to offer addresses to new nodes.

Major research efforts in the area of MANET focus on developing efficient routing protocols which assume that mobile nodes are configured a priori with a unique address before they enter a network. A major advantage of an embodiment of the present invention is that it gives a good solution for unique address assignment of the nodes in a MANET. An embodiment of the present invention is directed to a binary numbering address allocation method in heterogeneous wireless networks, which guarantees that addresses assigned by different host are exclusive.

The proposed solution does not make use of any centralized server. A host could acquire an address for itself (when starting a new network) or from a neighbour and nevertheless ensures the uniqueness of the address. This way, an embodiment of the present invention eliminates the need for dealing with duplicate addresses often implementing duplication address detection mechanisms (DAD) to resolve address conflicts and hence avoid the broadcast storm problem and extra packet overhead introduced by the use of these costly mechanisms.

Moreover, the proposed binary numbering address allocation method allows, in practice, that every host could be moved around in a multi-hop wireless network and/or leave after allocated an address without affecting the overall addressing effectiveness.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

It will also be appreciated by the person of skill in the art that various modifications may be made to the above-described embodiments without departing from the scope of the present invention as defined by the appended claims.

The invention claimed is:

1. A method in a network node for distributed network address allocation, comprising:
maintaining an integer seed value n and an integer state value s, with a configuration parameter of the node being determined from the seed value n;
receiving a request from a new node wishing to join the network and itself adapted to perform the method;
generating a proposed seed value using the formula $(n+2^s)$ and a proposed state value using the formula $(s+1)$;
offering the proposed seed and state values to the new node; and,
if the proposed seed and state values are accepted by the new node, updating the node's state value s to be the same as that accepted by the new node.

2. The method recited in dam 1, wherein the configuration parameter forms at least part of an address of the node.

3. The method recited in claim 1, wherein the configuration parameter is determined to be n.

4. A network node adapted for distributed network address allocation, comprising:
means for maintaining an integer seed value n and an integer state value s, with a configuration parameter of the node being determined from the seed value n;
means for receiving a request from a new node wishing to join the network and itself adapted to perform the method;
means for generating a proposed seed value using the formula $(n+2^s)$ and a proposed state value using the formula $(s+1)$;
means for offering the proposed seed and state values to the new node; and,
means for updating the node's state value s to be the same as that accepted by the new node, if the proposed seed and state values are accepted by the new node.

5. The network node recited in claim 4, wherein the configuration parameter forms at least part of an address of the node.

6. The network node recited in claim 4, wherein the configuration parameter is determined to be n.

\* \* \* \* \*

UNITED STATES PATENT AND TRADEMARK OFFICE
CERTIFICATE OF CORRECTION

PATENT NO. : 8,797,916 B2
APPLICATION NO. : 13/386102
DATED : August 5, 2014
INVENTOR(S) : Sadok et al.

Page 1 of 1

It is certified that error appears in the above-identified patent and that said Letters Patent is hereby corrected as shown below:

Specification

In Column 1, Line 48, delete "ietfzeroconf" and insert -- ietf.zeroconf --, therefor.

Claims

In Column 10, Line 48, in Claim 2, delete "dam 1," and insert -- claim 1, --, therefor.

Signed and Sealed this
Second Day of August, 2016

Michelle K. Lee
*Director of the United States Patent and Trademark Office*